United States Patent
Decius et al.

(10) Patent No.: US 11,400,951 B2
(45) Date of Patent: Aug. 2, 2022

(54) CONTROL SYSTEM FOR A MOTOR VEHICLE, MOTOR VEHICLE, METHOD FOR CONTROLLING A MOTOR VEHICLE, COMPUTER PROGRAM PRODUCT AND COMPUTER-READABLE MEDIUM

(71) Applicant: HELLA GMBH & CO. KGAA, Lippstadt (DE)

(72) Inventors: Nikolaus Decius, Lippstadt (DE); Julian Eckstein, Herten (DE); Carsten Kuegeler, Lippstadt (DE); Sergey Orlov, Paderborn (DE); Peter Grabs, Wuerzburg (DE); Matthias Korte, Wuerzburg (DE); Pascal Vollmer, Karlsruhe (DE); Heiko Lerch, Ruelzheim (DE); Michael Claus, Schwalmstadt-Roershain (DE); Florian Oszwald, Munich (DE); Juergen Gebert, Moosburg (DE); Fridolin Bauer, Garching (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 57 days.

(21) Appl. No.: 17/101,667

(22) Filed: Nov. 23, 2020

(65) Prior Publication Data
US 2021/0070312 A1    Mar. 11, 2021

Related U.S. Application Data

(63) Continuation of application No. PCT/EP2019/062066, filed on May 10, 2019.

(30) Foreign Application Priority Data

May 22, 2018   (DE) .................... 10 2018 112 254.3

(51) Int. Cl.
| | | |
|---|---|---|
| *B60W 30/02* | (2012.01) | |
| *B60W 50/029* | (2012.01) | |
| *B60W 50/02* | (2012.01) | |

(52) U.S. Cl.
CPC ...... *B60W 50/029* (2013.01); *B60W 50/0205* (2013.01); *B60W 50/0225* (2013.01);
(Continued)

(58) Field of Classification Search
CPC .......... B60W 50/029; B60W 50/0205; B60W 50/0225; B60W 2050/022;
(Continued)

(56) References Cited

U.S. PATENT DOCUMENTS

| | | |
|---|---|---|
| 5,957,985 A | 9/1999 | Wong et al. |
| 7,676,286 B2 * | 3/2010 | Disser .................... B60T 8/885 |
| | | 700/20 |

(Continued)

FOREIGN PATENT DOCUMENTS

| | | |
|---|---|---|
| DE | 19829126 A1 | 5/1999 |
| DE | 102004051078 A1 | 5/2006 |

(Continued)

OTHER PUBLICATIONS

International Search Report dated Aug. 1, 2019 in corresponding application PCT/EP2019/062066.

*Primary Examiner* — Masud Ahmed
(74) *Attorney, Agent, or Firm* — Muncy, Geissler, Olds & Lowe, P.C.

(57) ABSTRACT

A control system for a motor vehicle, including a first control unit for controlling a first function of the motor vehicle, a second control unit for controlling a second function of the motor vehicle and a backup control unit. To ensure the proper execution of functions controlled of a motor vehicle controlled with the aid of control units even (Continued)

in the case of a defective control unit with preferably little additional effort, the backup control unit is configurable depending on the input of an error signal of the first or second control unit such that an actuator corresponding to the defective control unit is controllable with the aid of the backup control unit. A first backup power electronic module is assigned to the first actuator, and a second backup power electronic module is assigned to the second actuator.

11 Claims, 1 Drawing Sheet

(52) U.S. Cl.
CPC ............... *B60W 2050/022* (2013.01); *B60W 2050/0292* (2013.01); *B60W 2050/0297* (2013.01)

(58) Field of Classification Search
CPC . B60W 2050/0292; B60W 2050/0297; B60W 60/00; B60W 50/04; B60W 50/023; B60T 2270/413; B60T 2270/84
See application file for complete search history.

(56) References Cited

U.S. PATENT DOCUMENTS

| 10,185,315 | B2 | 1/2019 | Naoi et al. |
| 10,202,090 | B2 | 2/2019 | Arnold et al. |
| 2015/0361940 | A1* | 12/2015 | Ishii ..................... F02N 11/084 701/112 |
| 2019/0077450 | A1* | 3/2019 | Sasaki ..................... H02P 25/22 |
| 2019/0210590 | A1* | 7/2019 | Hoshino ......... B60W 30/18127 |
| 2021/0078556 | A1* | 3/2021 | Laine ..................... B60T 8/321 |
| 2021/0129831 | A1* | 5/2021 | Hecker ............... B60W 60/007 |
| 2021/0163026 | A1* | 6/2021 | Ochida ............... B60W 50/035 |

FOREIGN PATENT DOCUMENTS

| DE | 102006062300 | A1 | 10/2008 |
| EP | 0942849 | A1 | 9/1999 |
| EP | 2765045 | A1 | 8/2014 |
| EP | 3113351 | A1 | 1/2017 |
| FR | 2843341 | B1 | 4/2005 |

* cited by examiner

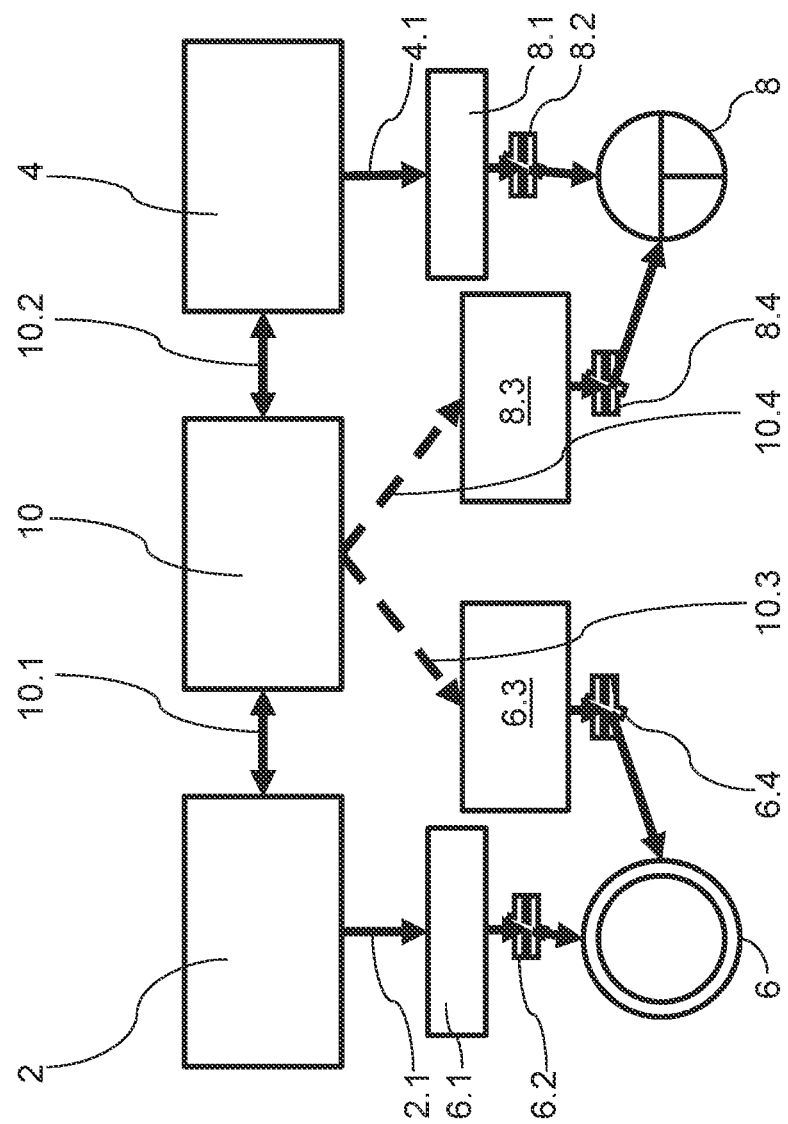

CONTROL SYSTEM FOR A MOTOR VEHICLE, MOTOR VEHICLE, METHOD FOR CONTROLLING A MOTOR VEHICLE, COMPUTER PROGRAM PRODUCT AND COMPUTER-READABLE MEDIUM

This nonprovisional application is a continuation of International Application No. PCT/EP2019/062066, which was filed on May 10, 2019, and which claims priority to German Patent Application No. 10 2018 112 254.3, which was filed in Germany on May 22, 2018, and which are both herein incorporated by reference.

BACKGROUND OF THE INVENTION

Field of the Invention

The present invention relates to a control system for a motor vehicle, a motor vehicle, a method for controlling a motor vehicle, a computer program product and a computer-readable medium.

Description of the Background Art

Control systems of motor vehicles, motor vehicles, methods for controlling motor vehicles, computer program products and computer-readable media are already known in numerous design variants from the prior art.

For example, a control system for a motor vehicle is known from the machine translation into English of FR 2 843 341 B1, which comprises a first control unit designed as a brake control unit for controlling a first function of the motor vehicle designed as a braking function, a second control unit designed as a steering control unit for controlling a second function of the motor vehicle designed as a steering function, and a backup control unit designed as a central control unit, the brake control unit and the steering control unit each being connected to at least one actuator in a signal-transmitting and power-transmitting manner, and the brake control unit being connected to the central control unit in a signal-transmitting manner. In the case of a malfunction of the brake control unit, an emergency braking action is initiated and controlled by the central control unit.

SUMMARY OF THE INVENTION

It is therefore an object of the present invention to ensure the proper execution of functions of a motor vehicle controlled with the aid of control units with preferably little additional effort, even in the case of a defective control unit.

An advantage of the invention is, in particular, that different functions of a motor vehicle which are controlled separately and with the aid of control units continue to be carried out safely with preferably little additional effort, even if one of the control units malfunctions. At least two functions of the motor vehicle, which differ from each other and are each controlled by a control unit, continue to be carried out if one of the two control units malfunctions, without a backup control unit having to be provided for each of the two control units. Correspondingly, it is possible to save installation space and weight and to reduce costs. This is very important, particularly in the case of modern motor vehicles having a high degree of electrical and electronic functionality, i.e. a large number of functions controlled with the aid of control units. The provision of a first backup power electronic module for the first actuator and a second backup power electronic module for the second actuator furthermore provides an additional redundancy, so that the protection against to a malfunction is further improved.

The wording, according to which at least the first or the second control unit is connected in a signal-transmitting manner to the backup control unit, is to be generally interpreted as described herein below and the wording, according to which the backup control unit is to be connected in a signal-transmitting manner to the second control unit, is to be generally interpreted as described herein below. Further, instead of direct signal-transmitting connections, indirect signal-transmitting connections are also conceivable.

For example, an indirect signal-transmitting connection can also be understood to be that, in the particular case of a malfunction, the first and/or second control unit forwards an error message to a higher-level control unit with the aid of a signal-transmitting connection, and the higher-level control unit then generates a corresponding output signal and transmits it to the backup control unit. The output signal of the higher-level control unit thus results in a configuration of the backup control unit in such a way that the function of the motor vehicle corresponding to the defective control unit is controllable with the aid of the backup control unit. This applies correspondingly to the method according to the invention, whereby the backup control unit controls the function of the motor vehicle corresponding to the defective control unit, depending on the output signal of the higher-level control unit. The higher-level control unit may be, for example, a central control unit.

A single backup control unit may also be used for more than two control units controlling different functions of the motor vehicle. The aforementioned advantages may be further increased in this way. The term "control unit" is to be generally understood according to the invention and designates any type of electric or electronic device for the automatic control of a function of a motor vehicle.

The first and second backup power electronic modules are selectable within broad, suitable parameters according to type, function, material, dimensioning, number and arrangement. One advantageous refinement provides that the first and/or the second backup power electronic module is/are arranged spatially separated from the backup control unit. In this way, the EMC, i.e. the electromagnetic compatibility, of the control system is improved.

An example of the control system according to the invention provides that the first backup power electronic module is disposed in the direct spatial vicinity of the first actuator, and/or the second backup power electronic module is disposed in the direct spatial vicinity of the second actuator. The paths for the electrical conductors between the particular backup power electronic modules and the actuator corresponding thereto are preferably kept short thereby. A compact structure is further made possible thereby.

An example of the control system according to the invention provides that the first backup power electronic module is connectable in a current-conducting manner to the first actuator and/or the second actuator with the aid of a disconnector, and/or the second backup power electronic module is connectable to the second actuator with the aid of a disconnector. In this way, a safe, namely galvanic, isolation of the first and/or the second backup power electronic module from the corresponding actuator in each case is made possible in an emergency. The backup control unit itself correspondingly does not require a galvanically isolatable output stage.

It is possible that the backup control unit is provided only for the case of a malfunction of the first or the second control unit. However, one particularly advantageous refinement of the control system according to the invention provides that the backup control unit is simultaneously designed as a third control unit for controlling a third function of the motor vehicle, and the first or second actuator of the motor vehicle corresponding to the defective first or second control unit is controllable with the aid of the backup control unit as function of the input of the error signal, in addition to the or instead of the third function of the motor vehicle. The necessary installation space and the weight s well as the manufacturing costs of the motor vehicle associated therewith are further reduced hereby.

The same applies to a refinement of the method according to the invention, whereby the backup control unit is simultaneously designed as a third control unit for controlling a third function of the motor vehicle, and the first or second actuator of the motor vehicle corresponding to the defective first or second control unit is controllable as function of the input of the error signal, in addition to the or instead of the third function of the motor vehicle.

In principle, the first function of the motor vehicle controlled by a first control unit and the second function of the motor vehicle controlled by a second control unit are freely selectable within broad, suitable parameters. However, one particularly advantageous refinement provides that the first function of the motor vehicle is designed as a braking function of the motor vehicle, and the second function of the motor vehicle is designed as a steering function of the motor vehicle. These are central and safety-relevant functions of the motor vehicle, whose proper execution is of crucial importance, in particular in autonomous motor vehicles.

Autonomous motor vehicles are motor vehicles, in which the vehicle driver performs only a certain control task if at all. Autonomous motor vehicles are thus designed and configured to participate in road traffic essentially independently of the intervention of a vehicle driver. The vehicle driver is more of a passenger than a decision-maker determining the functions of the motor vehicle.

However, the term "autonomous" can be broadly interpreted, so that different degrees of autonomous driving and autonomous motor vehicles are encompassed thereby. For example, a situation-specific autonomous driving, and thus situation-specific autonomously driving motor vehicles, should be mentioned here, in which an autonomous driving does or does not take place, depending on the traffic situation and/or driving maneuver to be carried out. Correspondingly, one may alternatively speak of automated driving and automated motor vehicles.

This applies similarly to one advantageous refinement of the method according to the invention, whereby the first function of the motor vehicle is designed as a braking function of the motor vehicle, and the second function of the motor vehicle is designed as a steering function of the motor vehicle.

A further advantageous refinement of the control system according to the invention provides that the control system has an operating interface and may be transferred from a deactivation state into an activation state, depending on the presence of an activation signal at the operating interface, the backup control unit not controlling the function of the motor vehicle corresponding to the defective control unit in the deactivation state of the control system, independently of the input of the error signal, and controlling the function of the motor vehicle corresponding to the defective control unit in the activation state of the control system depending on the input of the error signal. This makes it possible to equip motor vehicles with the control system according to the invention already at a point in time at which, for example, autonomous motor vehicles and functionalities associated therewith have not yet been approved by law. Upon a later change in law, it will then be possible to switch over to an autonomous driving mode of the motor vehicle and thus to a control system according to the invention in the activation state thereof with little effort.

This is advantageous if legal frameworks exist, which deviate from each other in different countries, for example with respect to the permissibility of autonomous motor vehicles. According to the aforementioned refinement, it is possible to develop, manufacture and market a uniform motor vehicle model with respect to the components relevant to the invention, despite deviating legal provisions in individual countries.

The same applies to the refinement of the method according to the invention for controlling a motor vehicle, whereby the control system has an operating interface and is transferred from a deactivation state to an activation state, depending on the presence of an activation signal at the operating interface, the backup control unit not controlling the function of the motor vehicle corresponding to the defective control unit in the deactivation state of the control system, independently of the input of the error signal, and controlling the function of the motor vehicle corresponding to the defective control unit in the activation state of the control system depending on the input of the error signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE shows an exemplary embodiment of a control system according to the invention for a motor vehicle.

DETAILED DESCRIPTION

An exemplary embodiment of a control system according to the invention for a motor vehicle is shown by way of example in the figure. The control system includes a first control unit 2 for a first function and a second control unit 4 for a second function of a motor vehicle, which is not illustrated in greater detail. The motor vehicle is designed as an autonomous motor vehicle, in which the functions of the motor vehicle are essentially automatically selected and carried out by the motor vehicle.

The first function is designed as a braking function and the second function is designed as a steering function of the motor vehicle. Correspondingly, first control unit 2 controls the braking function of the motor vehicle, and second control unit 4 controls the steering function of the motor vehicle. The control system includes a first actuator 6 designed as a brake for carrying out the braking function and a second actuator 8 designed as a steering system for carrying out the steering function. Control unit 2 for controlling the braking function of the motor vehicle is in signal-transmitting connection to a first power electronic module 6.1 of first actuator 6 of the motor vehicle designed as a brake, and second control unit 4 is in signal-transmitting connection to a second power electronic module 8.1 of second actuator 8 of the motor vehicle designed as a steering system. Even though a first actuator 6 designed as a brake is referred to in the present exemplary embodiment, it may, of course, according to the invention, also be a plurality of brakes.

To enable the braking function and the steering function of the motor vehicle to be properly and thus safely carried out even if one of control units 2 and 4 malfunctions, the control system for the motor vehicle includes not only the two control units 2 and 4 but also a backup control unit 10.

First power electronic module 6.1 is disposed spatially separated from first control unit 2, second control unit 4 and backup control unit 10 and forms a structural unit with first actuator 6 designed as a brake. Correspondingly, first power electronic module 6.1 is disposed in the immediate spatial vicinity of first actuator 6. First power electronic module 6.1 is current-conductively connectable to first actuator 6 with the aid of a disconnector 6.2. First power electronic module 6.1 may thus be disconnected safely, namely galvanically, from first actuator 6 in an emergency with the aid of disconnector 6.2. The same applies to a first backup power electronic module 6.3, which is connectable in a signal-transmitting manner to backup control unit 10. Backup power electronic module 6.3 is also part of the aforementioned structural unit, so that this structural unit comprises brake 6, first power electronic module 6.1 and first backup power electronic module 6.3. Accordingly, first backup power electronic module 6.3 is also disposed spatially separated from backup control unit 10 and in the immediate spatial vicinity of first actuator 6, namely brake 6. First backup power electronic module 6.3 is also current-conductively connectable to first actuator 6 with the aid of a disconnector 6.4. First backup power electronic module 6.3 may thus be disconnected safely, namely galvanically, from first actuator 6 in an emergency with the aid of disconnector 6.4.

This applies similarly to second power electronic module 8.1. Second power electronic module 8.1 is also disposed spatially separated from first control unit 2, second control unit 4 and backup control unit 10 and forms a structural unit with second actuator 8 designed as a steering system. Correspondingly, second power electronic module 8.1 is disposed in the immediate spatial vicinity of second actuator 8 Second power electronic module 8.1 is current-conductively connectable to second actuator 8 with the aid of a disconnector 8.2. Second power electronic module 8.1 may thus be disconnected safely, namely galvanically, from second actuator 8 in an emergency with the aid of disconnector 8.2. The same applies to a second backup power electronic module 8.3, which is connectable in a signal-transmitting manner to backup control unit 10. Second backup power electronic module 8.3 is also part of the aforementioned structural unit, so that this structural unit comprises steering system 8, second power electronic module 8.1 and second backup power electronic module 8.3. Accordingly, second backup power electronic module 8.3 is also disposed spatially separated from backup control unit 10 and in the immediate spatial vicinity of second actuator 8, namely steering system 8. Second backup power electronic module 8.3 is also current-conductively connectable to second actuator 8 with the aid of a disconnector 8.4. Second backup power electronic module 8.3 may thus be disconnected safely, namely galvanically, from second actuator 8 in an emergency with the aid of disconnector 8.4.

In other applications, the braking function and/or the steering function may involve a different number of actuators. Those skilled in the art will choose and define the corresponding selection and number of actuators for the particular function of the motor vehicle, depending on the individual case.

The particular signal-transmitting connection between first control unit 2 and first power electronic module 6.1 of brake 6 and between second control unit 4 and second power electronic module 8.1 of steering system 8 is symbolized in the figure on the basis of solid arrows 2.1 and 4.1. Backup control unit 10 is in signal-transmitting connection to first and second control units 2 and 4, which is symbolized in the figure by solid double arrows 10.1 and 10.2. At the same time, backup control unit 10 is also in signal-transmitting connection to first backup power electronic module 6.3 of brake 6 and second backup power electronic module 8.3 of steering system 8. This is symbolized by dashed arrows 10.3 and 10.4.

Brake 6 and steering system 8 of the motor vehicle are safety-relevant and thus very important functions of the motor vehicle. This is all the more true for the selected exemplary embodiment, which, after all, involves an autonomous motor vehicle.

The method according to the invention is explained in greater detail below, based on the figure.

During normal operation of the control system according to the invention for the autonomous motor vehicle, brake 6 is controlled for the braking function of the motor vehicle with the aid of first control unit 2, and steering system 8 is controlled for the steering function of the motor vehicle with the aid of second control unit 4. The need for a braking intervention by first control unit 2 or for a steering intervention by second control unit 4 is decided in first control unit 2 or in second control unit 4 or in a control unit superordinate to particular control unit 2, 4 in the manner known to those skilled in the art, based on input signals from sensors of the motor vehicle present at the corresponding control unit. A possible higher-level control unit as well as the sensors of the motor vehicle are not illustrated in the figure.

During the normal operation of the control system according to the invention described above, according to the present exemplary embodiment, backup control unit 10 does not engage with the braking function and not with the steering function of the motor vehicle. Backup control unit 10 monitors the proper function of first control unit 2 and second control unit 4 with the aid of signal-transmitting connections 10.1 and 10.2 existing between first control unit 2 and backup control unit 10 as well as between the latter and second control unit 4. In the case of a malfunction of the two control units 2 and 4, a corresponding error signal from defective control unit 2 or 4 is present as an input signal at backup control unit 10.

For example, if first control unit 2 is malfunctioning in such a way that brake 6 controlled thereby is no longer properly controlled, and the braking function of the motor vehicle is this no longer safely carried out, this error is reported to backup control unit 10 with the aid of signal-transmitting connection 10.1, whereupon backup control unit 10 is configured in such a way that it controls the braking function of the motor vehicle, i.e. it controls the function of the motor vehicle corresponding to defective first control unit 2. For this purpose, backup control unit 10 exchanges signals with first backup power electronic module

6.3 of brake 6 of the motor vehicle with the aid of signal-transmitting connection 10.3. In the case of a malfunction of first control device 2, brake 6 is thus no longer controlled by first control unit 2 but instead by backup control unit 10. The same applies to a defect in first power electronic module 6.1 of brake 6, which is driven, i.e. controlled, by first control unit 2 during normal operation.

This applies similarly if second control unit 4 malfunctions. In this case, backup control unit 10 receives a corresponding error message with respect to second control unit 4 with the aid of signal-transmitting connection 10.2, whereupon backup control unit 10 is configured in such a way that it controls the steering function of the motor vehicle. Steering system 8 is thus no longer controlled by defective second control unit 4 but rather by backup control unit 10 with the aid of signal-transmitting connection 10.4 and second backup power electronic module 8.3, which is assigned to steering system 8. The same applies to a defect in second power electronic module 8.1 of steering system 8, which is driven, i.e. controlled, by second control unit 4 during normal operation.

The invention is not limited to present exemplary embodiment. For example, it is conceivable that the control system according to the invention for a motor vehicle is present in a motor vehicle and is deactivated and may be activated for a future used by repair shop personnel or the like with the aid of an operating intervention of a vehicle driver. Correspondingly, in other specific embodiments of the control system according to the invention, it may be provided that the control system has an operating interface and may be transferred from a deactivation state to an activation state depending on the presence of an activation signal at the operating interface, the backup control unit not controlling the actuator of the motor vehicle corresponding to the defective control unit in the deactivation state of the control system, independently of the input of the error signal, and controlling the actuator of the motor vehicle corresponding to the defective control unit in the activation state of the control system, depending on the input of the error signal.

This applies similarly to the method according to the invention for controlling a motor vehicle, whereby, in another specific embodiment of the method according to the invention, the control system has an operating interface and is transferred from a deactivation state into an activation state, depending on the presence of an activation signal at the operating interface, the backup control unit not controlling the function of the motor vehicle corresponding to the defective control unit in the deactivation state of the control system, independently of the input of the error signal, and controlling the function of the motor vehicle corresponding to the defective control unit in the activation state of the control system, depending on the input of the error signal.

For example, it may be possible that autonomous motor vehicles are not yet approved by law in some countries. Upon a later change in the legal framework, the motor vehicle prepared according to the invention may be converted to autonomous driving mode with little effort and thus to the use of a control system according to the invention as well as to the use of a method according to the invention for controlling the motor vehicle in its activation state.

It would furthermore be possible that, during normal operation of the control system according to the invention, in contrast to the exemplary embodiment, the backup control unit is simultaneously designed as a third control unit for controlling a third function of the motor vehicle, and the first or second function of the motor vehicle corresponding to the defective first or second control unit is controlled with the aid of the backup control unit, depending on the input of the error signal, in addition to the or instead of the third function of the motor vehicle.

For example, it would be conceivable that, as the third control unit, the backup control unit controls a subordinate function of the motor vehicle during normal operation of the motor vehicle. Should a case of a malfunction of the first or the second control unit then occur, the backup control unit could be configured in such a way that, instead of the subordinate function, it controls a function relatively superordinate thereto in the case of a malfunction, namely one of the functions of the motor vehicle controlled by the first or the second control unit. As in the exemplary embodiment, this could be the braking function or the steering function of the motor vehicle. In other embodiments of the invention, for example in the case of equal-ranking functions of the motor vehicle, it would also be conceivable, however, that the backup control unit controls the function corresponding to the defective control unit in addition to the function corresponding to the backup control unit in the normal operation thereof.

The invention is not limited to the braking function and the steering function of a motor vehicle. The invention may also be advantageously used for other functions of a motor vehicle.

The invention also relates to a motor vehicle, comprising a control system according to the invention, a computer program product, comprising commands which cause the control system according to the invention, for example according to the present exemplary embodiment, to carry out the method steps of the method according to the invention, for example according to the present exemplary embodiment, as well as a computer-readable medium, on which the computer program product according to the invention is stored.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A control system for a motor vehicle, the control system comprising:
    a first control unit to control a first function of the motor vehicle;
    a second control unit to control a second function of the motor vehicle; and
    a backup control unit,
    wherein the first control unit is connected in a signal-transmitting and power-transmitting manner to a first actuator for controlling the first function, and the second control unit is connected in a signal-transmitting and power-transmitting manner to a second actuator for controlling the second function,
    wherein, during a normal operation of the control system, the first actuator is powered via a first power electronic module connected in a signal-transmitting matter to the first control unit,
    wherein, during the normal operation of the control system, the second actuator is powered via a second power electronic module connected in a signal-transmitting manner to the second control unit,
    wherein the backup control unit is connected in a signal-transmitting manner to the first control unit and the second control unit and is configurable depending on an input of an error signal transmitted from the first control unit or the second control unit, such that the first actuator or the second actuator corresponding to the first control unit or the second control unit that transmitted the error signal is controllable via the backup control unit, wherein a first backup power electronic module is provided and is assigned to the first actuator, and a second backup power electronic module is provided and is assigned to the second actuator, the first backup power electronic module being separate from the second backup power electronic module, and wherein the backup control unit is connectable in a signal-transmitting manner to each of the first backup power electronic module and the second backup power electronic module to enable control of the first actuator or the second actuator when the backup control unit receives the error signal from the first control unit or the second control unit.

2. The control system according to claim 1, wherein the first and/or the second backup power electronic module(s) are disposed spatially separated from the backup control unit.

3. The control system according to claim 2, wherein the first backup power electronic module is disposed in an immediate spatial vicinity of the first actuator, and/or the second backup power electronic module is disposed in an immediate spatial vicinity of the second actuator.

4. The control system according to claim 1, wherein the first backup power electronic module is current-conductively connectable to the first actuator via a disconnector, and/or the second backup power electronic module is current-conductively connectable to the second actuator via a disconnector.

5. The control system according to claim 1, wherein the backup control unit is designed as a third control unit for controlling a third function of the motor vehicle, and the first or second actuator of the motor vehicle corresponding to the first or second control unit that transmitted the error signal is controllable via the backup control unit in addition to or instead of the third function of the motor vehicle.

6. The control system according to claim 1, wherein the control system has an operating interface and is transferred from a deactivation state to an activation state, depending on a presence of an activation signal at the operating interface, the backup control unit not controlling the first or second actuator of the motor vehicle corresponding to the first or second control unit that transmitted the error signal in the deactivation state of the control system, and controlling the first or second actuator of the motor vehicle corresponding to the first or second control unit that transmitted the error signal in the activation state of the control system.

7. A motor vehicle comprising:
the control system according to claim 1.

8. A method for controlling a motor vehicle, the method comprising:
providing a control system of the motor vehicle including a first control unit for controlling a first function of the motor vehicle, a second control unit for controlling a second function of the motor vehicle and a backup control unit;
connecting the first control unit in a signal-transmitting and power-transmitting manner to a first actuator for controlling the first function;
connecting the second control unit in a signal-transmitting and power-transmitting manner to a second actuator for controlling the second function;
powering, during a normal operation of the control system, the first actuator via a first power electronic module connected in a signal-transmitting matter to the first control unit;
powering, during the normal operation of the control system, the second actuator via a second power electronic module connected in a signal-transmitting manner to the second control unit;
connecting the backup control unit in a signal-transmitting manner to the first control unit and the second control unit, the backup control unit configured depending on an input of an error signal transmitted from the first control unit or the second control unit, such that the first actuator or the second actuator corresponding to the first control unit or the second control unit that transmitted the error signal is controlled via the backup control unit;
assigning a first backup power electronic module to the first actuator;
assigning a second backup power electronic module to the second actuator, the first backup power electronic module being separate from the second backup power electronic module; and
connecting the backup control unit connected in a signal-transmitting manner to each of the first backup power electronic module and the second backup power electronic module to enable control of the first actuator or the second actuator when the backup control unit receives the error signal from the first control unit or the second control unit.

9. The method according to claim 8, wherein the backup control unit is designed as a third control unit for controlling a third function of the motor vehicle, and wherein the backup control unit controls the first or second actuator of the motor vehicle corresponding to the first or second control unit that transmitted the error signal in addition to or instead of the third function of the motor vehicle.

10. The method according to claim 8, wherein the control system has an operating interface and is transferred from a deactivation state into an activation state depending on a presence of an activation signal at the operating interface, the backup control unit not controlling the first or second actuator of the motor vehicle corresponding to the first or second control unit that transmitted the error signal in the deactivation state of the control system, and controlling the first or second actuator of the motor vehicle corresponding to the first or second control unit that transmitted the error signal in the activation state of the control system.

11. A non-transitory computer-readable medium storing a computer program thereon that, when executed by a computer, causes the computer to carry out the method according to claim 8.

* * * * *